United States Patent
Oelfke et al.

(10) Patent No.: US 9,689,309 B2
(45) Date of Patent: Jun. 27, 2017

(54) SYSTEMS AND METHODS FOR CARBON DIOXIDE CAPTURE IN LOW EMISSION COMBINED TURBINE SYSTEMS

(75) Inventors: Russell H. Oelfke, Houston, TX (US); Richard A. Huntington, Houston, TX (US); Sulabh K. Dhanuka, Houston, TX (US); Dennis M. O'Dea, Somerset, NJ (US); Robert D. Denton, Bellaire, TX (US); O. Angus Sites, Spring, TX (US); Franklin F. Mittricker, Jamul, CA (US)

(73) Assignee: ExxonMobil Upstream Research Company, Spring, TX (US)

( * ) Notice: Subject to any disclaimer, the term of this patent is extended or adjusted under 35 U.S.C. 154(b) by 677 days.

(21) Appl. No.: 14/005,176

(22) PCT Filed: Mar. 5, 2012

(86) PCT No.: PCT/US2012/027780
§ 371 (c)(1),
(2), (4) Date: Nov. 25, 2013

(87) PCT Pub. No.: WO2012/128928
PCT Pub. Date: Sep. 27, 2012

(65) Prior Publication Data
US 2014/0083109 A1 Mar. 27, 2014

Related U.S. Application Data

(60) Provisional application No. 61/466,381, filed on Mar. 22, 2011, provisional application No. 61/466,384, (Continued)

(51) Int. Cl.
*F02C 3/34* (2006.01)
*F02C 1/00* (2006.01)
(Continued)

(52) U.S. Cl.
CPC ............... *F02C 3/34* (2013.01); *B01D 53/62* (2013.01); *F02C 1/005* (2013.01); *F02C 1/08* (2013.01);
(Continued)

(58) Field of Classification Search
CPC .... F02C 3/34; F02C 1/005; F02C 1/08; F02C 6/02; F02C 6/10; Y02E 20/14; Y02E 20/16; Y02E 20/185; Y02E 20/326
See application file for complete search history.

(56) References Cited

U.S. PATENT DOCUMENTS 2,488,911 A 11/1949 Hepburn et al.
2,884,758 A 5/1959 Oberle
(Continued)

FOREIGN PATENT DOCUMENTS

CA 2231749 9/1998
CA 2550675 7/2005
(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.
(Continued)

*Primary Examiner* — Gerald L Sung
*Assistant Examiner* — Scott Walthour
(74) *Attorney, Agent, or Firm* — ExxonMobil Upstream Research Company Law Department

(57) ABSTRACT

Systems, methods, and apparatus are provided for generating power in combined low emission turbine systems and capturing and recovering carbon dioxide from the exhaust. In one or more embodiments, the exhaust from multiple turbine systems is combined, cooled, compressed, and separated to yield a carbon dioxide-containing effluent stream
(Continued)

and a nitrogen-containing product stream. Portions of the recycled exhaust streams and the product streams may be used as diluents to regulate combustion in each combustor of the turbine systems.

21 Claims, 3 Drawing Sheets

Related U.S. Application Data filed on Mar. 22, 2011, provisional application No. 61/466,385, filed on Mar. 22, 2011, provisional application No. 61/542,039, filed on Sep. 30, 2011, provisional application No. 61/542,035, filed on Sep. 30, 2011, provisional application No. 61/542,030, filed on Sep. 30, 2011, provisional application No. 61/542,031, filed on Sep. 30, 2011.

(51) Int. Cl.
*F02C 1/08* (2006.01)
*F02C 6/02* (2006.01)
*F02C 6/18* (2006.01)
*F02C 7/14* (2006.01)
*B01D 53/62* (2006.01)
*F02C 3/30* (2006.01)
*F02C 6/10* (2006.01)

(52) U.S. Cl.
CPC .............. *F02C 3/30* (2013.01); *F02C 6/02* (2013.01); *F02C 6/10* (2013.01); *F02C 6/18* (2013.01); *F02C 7/14* (2013.01); *B01D 2256/10* (2013.01); *B01D 2257/504* (2013.01); *B01D 2258/0283* (2013.01); *F05D 2270/08* (2013.01); *Y02C 10/04* (2013.01); *Y02E 20/14* (2013.01); *Y02E 20/16* (2013.01); *Y02E 20/185* (2013.01); *Y02E 20/326* (2013.01)

(56) References Cited

U.S. PATENT DOCUMENTS

| | | |
|---|---|---|
| 3,561,895 A | 2/1971 | Michelson |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |

(56) References Cited

U.S. PATENT DOCUMENTS

| | | |
|---|---|---|
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,055,803 A | 5/2000 | Mastronarde ............... 60/39.02 |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,666 B1 | 9/2001 | Ginter ........................ 60/39.05 |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,490,858 B2 | 12/2002 | Barrett et al. |
| 6,499,990 B1 | 12/2002 | Zink et al. |
| 6,502,383 B1 | 1/2003 | Janardan et al. |
| 6,505,567 B1 | 1/2003 | Liljedahl et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,640,548 B2 | 11/2003 | Brushwood et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Garry et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie ............................ 60/772 |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |

(56) References Cited

U.S. PATENT DOCUMENTS

| | | |
|---|---|---|
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |

(56) References Cited

U.S. PATENT DOCUMENTS

| | | |
|---|---|---|
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,555,796 B2 | 10/2013 | D'Agostini |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0112696 A1* | 6/2006 | Lynghjem .............. B01D 53/62 60/772 |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0201131 A1* | 9/2006 | McQuiggan ............ F01D 25/32 60/39.5 |
| 2006/0248888 A1 | 11/2006 | Geskes |
| 2006/0272331 A1* | 12/2006 | Bucker .................. C01B 3/386 60/774 |
| 2007/0000242 A1 | 1/2007 | Harmon et al. |
| 2007/0006592 A1 | 1/2007 | Balan et al. .................. 60/772 |

(56) References Cited

U.S. PATENT DOCUMENTS

| | | |
|---|---|---|
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0215350 A1* | 9/2007 | Kresnyak ............ E21B 41/0064 166/268 |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | Elkady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0289227 A1* | 11/2009 | Rising ................ B01D 53/1475 252/373 |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | Elkady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | Elkady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | | |
|---|---|---|---|
| CA | 2645450 | 9/2007 | |
| CA | 2614669 | 12/2008 | |
| EP | 0453059 | 6/1994 | |
| EP | 0770771 | 5/1997 | |
| EP | 0654639 | 9/1998 | |
| GB | 0776269 | 6/1957 | |
| GB | 1408174 | 10/1975 | ............ F01K 23/10 |
| GB | 2117053 | 10/1983 | |
| GB | 2397349 | 7/2004 | |
| WO | WO95/21683 | 8/1995 | |
| WO | WO97/07329 | 2/1997 | |
| WO | WO99/06674 | 2/1999 | |
| WO | WO99/63210 | 12/1999 | |
| WO | WO2005/064232 | 7/2005 | |
| WO | WO2006/107209 | 10/2006 | |
| WO | WO2007/068682 | 6/2007 | |
| WO | WO2008/074980 | 6/2008 | |
| WO | WO2008/142009 | 11/2008 | |
| WO | WO2008/155242 | 12/2008 | |
| WO | WO2009/120779 | 10/2009 | |
| WO | WO2009/121008 | 10/2009 | |
| WO | WO2010/044958 | 4/2010 | |

(56) References Cited

FOREIGN PATENT DOCUMENTS

| | | |
|---|---|---|
| WO | WO2010/066048 | 7/2010 |
| WO | WO2010/141777 | 12/2010 |
| WO | WO2011/003606 | 1/2011 |
| WO | WO2011/028322 | 3/2011 |
| WO | WO2012/003076 | 1/2012 |
| WO | WO2012/003077 | 1/2012 |
| WO | WO2012/003078 | 1/2012 |
| WO | WO2012/003079 | 1/2012 |
| WO | WO2012/003080 | 1/2012 |
| WO | WO2012003489 | 1/2012 |
| WO | WO2012/018458 | 2/2012 |
| WO | WO2012/018459 | 2/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

Air Separation Technology Ion Transport Membrane—Air Products 2008.
Air Separation Technology Ion Transport Membrane—Air Products 2011.
Anderson, R. E. (2006) "Durability and Reliability Demonstration of a Near-Zero-Emission Gas-Fired Power Plant," *California Energy Comm.*, CEC 500-2006-074, 80 pgs.
Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.
Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.
BP Press Release (2006) "BP and Edison Mission Group Plan Major Hydrogen Power Project for California," Feb. 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," KTH—Royal Institute Of Technology, Dept. of Chemical Engineering And Technology, 9 pgs.
Clark, Hal (2002) "Development of a Unique Gas Generator for a Non-Polluting Power Plant," California Energy Commission Feasibility Analysis, P500-02-011F, Mar. 2002, 42 pgs.
Ditaranto, et al. , (2006), "Combustion Instabilities in Sudden Expansion Oxy-Fuel Flames," *ScienceDirect, Combustion And Flame*, v. 146, Jun. 30, 2006, 15 pgs.
Foy, Kirsten et al. (2005) "Comparison of Ion Transport Membranes"—Fourth Annual Conference on Carbon Capture and Sequestration, DOE/NETL; May 2005, 11 pages.
Cho, J. H. et al. (2005) "Marrying LNG and Power Generation," Energy Markets; Oct./Nov. 2005; 10, 8; ABI/INFORM Trade & Industry, p. 28;.
Ciulia, Vincent. About.com. Auto Repair. How the Engine Works. 2001-2003.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, Aug. 7-12, 1988, pp. 41-44.
Cryogenics. Science Clarified. 2012. http://www.scienceclarified.com/Co-Di/Cryogenics.html.
Defrate, L. A. et al. (1959) "Optimum Design of Ejector Using Digital Computers" Chem. Eng. Prog. Symp. Ser., 55 ( 21) pp. 46.
Elwell, L. C. et al. (2005) "Technical Overview of Carbon Dioxide Capture Technologies for Coal-Fired Power Plants," *MPR Associates, Inc.*, Jun. 22, 2005, 15 pgs.

Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.
Ertesvag, I. S. et al. (2005) "Energy Analysis of a Gas-Turbine Combined-Cycle Power Plant With Precombustion CO2 Capture," Elsivier, 2004, pp. 5-39.
Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.
Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.
http://www.turbineinletcooling.org/resources/papers/CTIC_WetCompression_Shepherd_ASMETurboExpo2011.pdf , Shepherd, IGTI 2011—CTIC Wet Compression, Jun. 8, 2011.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Nanda, R. et al. (2007) "Utilizing Air Based Technologies as Heat Source for LNG Vaporization," presented at the $86^{th}$ Annual convention of the *Gas Processors of America* (GPA 2007), Mar. 11-14, 2007, San Antonio, TX.
Reeves, S. R. (2001) "Geological Sequestration of $CO_2$ in Deep, Unmineable Coalbeds: An Integrated Research and Commercial-Scale Field Demonstration Project," *SPE 71749*,10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the *Gas Processors of America* (GPA 2006), Grapevine, Texas, Mar. 5-8, 2006.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
vanHemert, P. et al. (2006) "Adsorption of Carbon Dioxide and a Hydrogen-Carbon Dioxide Mixture," *Intn'l Coalbed Methane Symposium (Tuscaloosa, AL) Paper* 0615, 9 pgs.
Zhu, J. et al. (2002) "Recovery of Coalbed Methane by Gas Injection," *SPE 75255*, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,557, filed Oct. 30, 2013, Lucas John Stoia et al.
PCT/RU2013/000162, Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.

(56) References Cited

OTHER PUBLICATIONS

U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

\* cited by examiner

SYSTEMS AND METHODS FOR CARBON DIOXIDE CAPTURE IN LOW EMISSION COMBINED TURBINE SYSTEMS

CROSS REFERENCE TO RELATED APPLICATIONS

This application is the National Stage entry under 35 U.S.C. 371 of PCT/US2012/027780, that published as WO 2012/128928 and was filed on 5 Mar. 2012 which claims the benefit of U.S. Provisional Application Nos. 61/542,039, filed on 30 Sep. 2011; U.S. Provisional Application 61/466, 384 filed Mar. 22, 2011; U.S. Provisional Application 61/542,030 filed Sep. 30, 2011; U.S. Provisional Application 61/466,385 filed Mar. 22, 2011; U.S. Provisional Application 61/542,031 filed Sep. 30, 2011; U.S. Provisional Application 61/466,381 filed Mar. 22, 2011; and U.S. Provisional Application 61/542,035 filed Sep. 30, 2011, each of which is incorporated by reference, in its entirety, for all purposes.

This application contains subject matter related to U.S. Provisional Application 61/542,037 filed Sep. 30, 2011 (PCT/US2012/027776, that published as WO 2012/128927 and was filed on 5 Mar. 2012); U.S. Provisional Application 61/542,041 filed Sep. 30, 2011 (PCT/US2012/027781, that published as WO 2012/128929 and was filed on 5 Mar. 2012); and U.S. Provisional Application 61/542,036 filed Sep. 30, 2011 (PCT/US2012/027774, that published as WO 2012/128926 and was filed on 5 Mar. 2012).

FIELD OF THE DISCLOSURE

Embodiments of the disclosure relate to low emission power generation. More particularly, embodiments of the disclosure relate to methods and apparatus for carbon dioxide capture for increased efficiency and reduced cost in low emission combined gas turbine systems.

BACKGROUND OF THE DISCLOSURE

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade policies in many countries makes reducing $CO_2$ emissions a priority for those countries as well as for the companies that operate hydrocarbon production systems therein.

Some approaches to lower $CO_2$ emissions include fuel de-carbonization or post-combustion capture using solvents, such as amines. However, both of these solutions are expensive and reduce power generation efficiency, resulting in lower power production, increased fuel demand and increased cost of electricity to meet domestic power demand. In particular, the presence of oxygen, $SO_X$, and $NO_X$ components makes the use of amine solvent absorption very problematic. Another approach is an oxyfuel gas turbine in a combined cycle (e.g., where exhaust heat from the gas turbine Brayton cycle is captured to make steam and produce additional power in a Rankine cycle). However, there are no commercially available gas turbines that can operate in such a cycle and the power required to produce high purity oxygen significantly reduces the overall efficiency of the process.

Moreover, with the growing concern about global climate change and the impact of carbon dioxide emissions, emphasis has been placed on minimizing carbon dioxide emissions from power plants. Gas turbine power plants are efficient and have a lower cost compared to nuclear or coal power generation technologies. Capturing carbon dioxide from the exhaust of a gas turbine power plant is very expensive, however, because the concentration of carbon dioxide in the exhaust stack is low, a large volume of gas needs to be treated, and the pressure of the exhaust stream is low. These factors, among others, result in a high cost of carbon dioxide capture.

Accordingly, there is still a substantial need for a low emission, high efficiency power generation process with incorporated $CO_2$ capture and recovery at a reduced cost.

SUMMARY OF THE DISCLOSURE

In the low emission power generation systems described herein, exhaust gases from low emission gas turbines, which are vented in a typical natural gas combined cycle (NGCC) plant, are instead separated and recovered. The apparatus, systems, and methods of the invention combine and recycle the exhaust streams of two gas turbines to efficiently generate power while concentrating and recovering carbon dioxide.

In systems and methods of the present invention, two gas turbine systems, each comprising a compressor, a combustion chamber, and an expander, are fluidly linked to operate in tandem and the exhaust gases from each system are combined. The combined exhaust gases are then cooled, compressed, and recycled. A portion of the recycled exhaust stream is supplied to one of the combustion chambers to act as a diluent to control or otherwise moderate the temperature of the combustion and flue gas entering the succeeding expander. The other portion of the recycled exhaust stream is separated to capture $CO_2$ in one stream and generate a separate product stream comprising nitrogen, oxygen, argon, or combinations thereof. A portion of the product stream from the $CO_2$ separator is then similarly supplied to the other combustion chamber to act as a diluent, while the remainder of the product stream may be used to generate additional power or for another purpose either within the system or externally. By combining the exhaust gases in this manner, the combustion products from each gas turbine within the overall system are concentrated and $CO_2$ can be captured and removed more easily, thereby leading to more efficient power generation.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION

Figure 1:
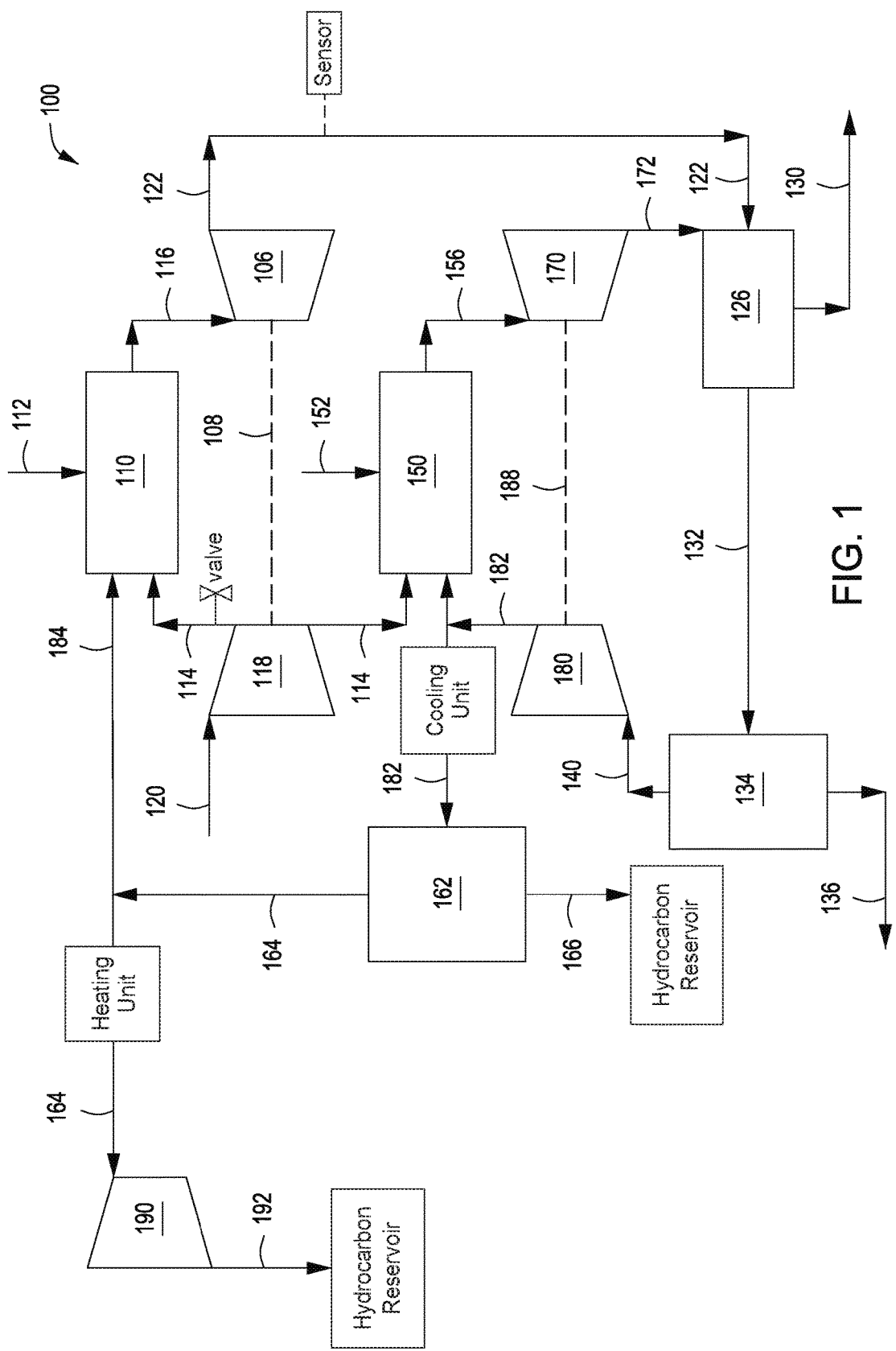
FIG. 1 depicts a combined low emission power generation system comprising two fluidly linked gas turbine systems and incorporating $CO_2$ separation.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "natural gas" refers to a multi-component gas obtained from a crude oil well (associated gas) and/or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof.

As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric" combustion refers to a combustion reaction having an equivalence ratio ranging from about 0.9:1 to about 1.1:1, or more preferably from about 0.95:1 to about 1.05:1. Use of the term "stoichiometric" herein is meant to encompass both stoichiometric and substantially stoichiometric conditions unless otherwise indicated.

As used herein, the term "stream" refers to a volume of fluids, although use of the term stream typically means a moving volume of fluids (e.g., having a velocity or mass flow rate). The term "stream," however, does not require a velocity, mass flow rate, or a particular type of conduit for enclosing the stream.

Embodiments of the presently disclosed systems and processes may be used to produce low emission electric power and $CO_2$ for enhanced oil recovery (EOR) or sequestration applications. According to embodiments disclosed herein, a mixture of compressed oxidant (typically air) and fuel is combusted in the combustion chambers of two separate but fluidly linked gas turbines and the exhaust gases from each are expanded to generate power. The exhaust gases are then combined, cooled, compressed, and separated to capture $CO_2$ and generate a product stream comprising nitrogen. In EOR applications, the recovered $CO_2$ is injected into or adjacent to producing oil wells, usually under supercritical conditions. The $CO_2$ acts as both a pressurizing agent and, when dissolved into the underground crude oil, significantly reduces the oil's viscosity enabling the oil to flow more rapidly through the earth to a removal well. The product stream comprising nitrogen (and frequently oxygen and argon as well) may be used to generate additional power, and may also be used for a variety of purposes, including for pressure maintenance applications. In pressure maintenance applications, an inert gas such as nitrogen is compressed and injected into a hydrocarbon reservoir to maintain the original pressure in the reservoir, thus allowing for enhanced recovery of hydrocarbons. The result of the systems disclosed herein is the production of power and the concentration and capture of $CO_2$ in a more economically efficient manner.

In one or more embodiments of the present invention, power generation systems are provided comprising a first compressor configured to receive and compress one or more oxidants to generate a compressed oxidant; a first combustion chamber configured to receive and combust a first portion of the compressed oxidant, at least one first fuel, and a first diluent to generate a first exhaust stream; and a first expander configured to receive the first exhaust stream and generate a first gaseous exhaust stream. The systems further comprise a second compressor configured to receive and compress a cooled recycle stream to generate a compressed recycle stream; a second combustion chamber configured to receive and combust a second portion of the compressed oxidant, at least one second fuel, and a second diluent to generate a second exhaust stream; and a second expander configured to receive the second exhaust stream and generate a second gaseous exhaust stream. The systems additionally comprise one or more heat recovery steam generators configured to receive and cool the first and second gaseous exhaust streams to generate steam and a combined exhaust stream; a recycle cooling unit configured to receive and cool the combined exhaust stream and generate a cooled recycle stream; and a separator configured to receive and separate a portion of the compressed recycle stream into a separator effluent stream and a separator product stream.

The one or more oxidants may comprise any oxygen-containing fluid, such as ambient air, oxygen-enriched air, substantially pure oxygen, or combinations thereof. In one or more embodiments of the invention, all or substantially all of the oxidant supplied to the combined system as a whole is compressed in and supplied by the first compressor. The compressed oxidant exiting the first compressor may then be split into two streams, such that a first portion of the compressed oxidant is directed to the first combustion chamber and a second portion of the compressed oxidant is directed to the second combustion chamber. The split may be equal or unequal, and may also be varied during operation to adapt to changes in the process.

The first and second fuels may be the same or different, and each fuel may comprise natural gas, associated gas, diesel, fuel oil, gasified coal, coke, naphtha, butane, propane, syngas, kerosene, aviation fuel, bio-fuel, oxygenated hydrocarbon feedstock, any other suitable hydrocarbon containing gases or liquids, hydrogen, or combinations thereof. Additionally, the fuels may comprise inert components including but not limited to $N_2$ or $CO_2$. In some embodiments, the first and/or the second fuels may be at least partially supplied by a hydrocarbon reservoir that is benefiting from enhanced oil recovery via injection of $CO_2$ captured via the process described herein. In certain embodiments, the first and the second fuels comprise natural gas.

The combustion conditions in each of the first and second combustion chambers may be lean, stoichiometric or substantially stoichiometric, or rich. In one or more embodiments, the combustion conditions in the first and second combustion chambers are stoichiometric or substantially stoichiometric. The first and second diluents are supplied to the first and second combustion chambers to control or otherwise regulate the temperature of the combustion and flue gas to meet the material requirements of the succeeding expanders. The flow of the first and second diluents, however, may also be adjusted to help maintain stoichiometric conditions in the respective combustion chambers, moderating changes in composition, volumetric flow, or other variations in the oxidant and fuel streams. In one or more embodiments, the first diluent provided to the first combustion chamber comprises at least a portion of the separator product stream. In the same or other embodiments, the second diluent provided to the second combustion chamber comprises at least a portion of the compressed recycle stream.

In some embodiments, high pressure steam may also be employed as a coolant in one or both of the first and second combustion chambers. In such embodiments, the addition of steam would reduce power and size requirements in the system, but would require the addition of a water recycle loop or loops. Additionally, in further embodiments, the compressed oxidant feed to one or both of the combustion chambers may comprise argon. For example, the oxidant may comprise from about 0.1 to about 5.0 vol % argon, or from about 1.0 to about 4.5 vol % argon, or from about 2.0 to about 4.0 vol % argon, or from about 2.5 to about 3.5 vol % argon, or about 3.0 vol % argon.

The first and second compressors may each be a single compressor or may be two or more compressors operating in parallel or in series. Each compressor may comprise a single stage or multiple stages. In multiple stage compressors, interstage cooling may optionally be employed to allow for higher overall compression ratios and higher overall power output. When more than one compressor is used to compress a process stream, the compressors taken together are considered herein to be the "first compressor" or the "second compressor," as appropriate. Each compressor may be of any type suitable for the process described herein. Such compressors include, but are not limited to, axial, centrifugal, reciprocating, or twin-screw compressors and combinations thereof. In one or more embodiments, the first and second compressors are axial compressors.

Combustion of the oxidant and fuel in each of the first and second combustion chambers generates a first exhaust stream and a second exhaust stream, respectively. The first and second exhaust streams comprise products of combustion, and their individual compositions will vary depending upon the composition of the fuel and the oxidant used in each combustion chamber. In one or more embodiments, the first and second exhaust streams may each comprise vaporized water, $CO_2$, carbon monoxide (CO), oxygen ($O_2$), nitrogen ($N_2$), argon (Ar), nitrogen oxides ($NO_X$), sulfur oxides ($SO_X$), hydrogen sulfide ($H_2S$), or combinations thereof.

The first exhaust stream may be expanded in the first expander to form a first gaseous exhaust stream, and the second exhaust stream may be expanded in the second expander to form a second gaseous exhaust stream. The first and second expanders may each be a single expander or may be two or more expanders operating in parallel or in series. Each expander may comprise a single stage or multiple stages. When more than one expander is used to expand an exhaust stream, the expanders taken together are considered herein to be the "first expander" or the "second expander," as appropriate. Each expander may be any type of expander suitable for the process described herein, including but not limited to axial or centrifugal expanders or combinations thereof. Expansion of the first and second exhaust streams generates power, which may be used to drive one or more compressors or electric generators. In one or more embodiments of the invention, the first expander is coupled to the first compressor via a common shaft or other mechanical, electrical, or other power coupling, such that the first compressor is at least partially driven by the first expander. In the same or other embodiments, the second expander is coupled to the second compressor via a common shaft or other mechanical, electrical, or other power coupling, such that the second compressor is at least partially driven by the second expander. In other embodiments, the first or the second compressors, or both, may be mechanically coupled to an electric motor with or without a speed increasing or decreasing device such as a gear box. When taken together, the first compressor, first combustion chamber, and first expander may be characterized as a Brayton cycle. Similarly, the second compressor, second combustion chamber, and second expander may also be characterized as a Brayton cycle.

After expansion, the first and second gaseous exhaust streams may in some embodiments be cooled in a heat recovery steam generator (HRSG). Although reference is made herein to a single HRSG, in practice two or more HRSGs may be used. Alternatively, any device designed to cool or recover heat from the first and second gaseous exhaust streams, such as for example one or more heat exchangers, regenerators, cooling units, or the like may be used in place of the HRSG. The HRSG may be configured to receive the first and second exhaust streams and utilize the residual heat in the streams to generate steam. The steam generated by the HRSG may be used for a variety of purposes, such as to drive a steam turbine generator in a Rankine cycle or for water desalination.

In one or more embodiments of the present invention, the first and second gaseous exhaust streams are fed to the HRSG separately and combined within the HRSG to form a combined exhaust stream. In other embodiments, the first and second gaseous exhaust streams may be combined upstream or downstream of the HRSG. When the streams are combined downstream, each of the first and second gaseous exhaust streams may be cooled in a separate HRSG and then combined to form the combined exhaust stream.

In one or more embodiments of the present invention, the combined exhaust stream may be sent to one or more cooling units configured to reduce the temperature of the combined exhaust stream and generate a cooled recycle stream. The cooling unit may be any type of apparatus suitable for lowering the temperature of the exhaust gases, such as for example a direct contact cooler (DCC), trim cooler, mechanical refrigeration unit, or combinations thereof. In some embodiments, the cooling unit is a DCC. The cooling unit can also be configured to remove a portion of condensed water from the cooled recycle stream via a water dropout stream. In some embodiments, the water dropout stream may optionally be routed to a HRSG to provide a water source for the generation of additional steam.

In some embodiments, the cooled recycle stream exiting the cooling unit may be sent to the second compressor and compressed to generate a compressed recycle stream. Cooling and compressing the exhaust gases helps to address issues related to the large volume of gas that must be treated and the low pressure of the exhaust streams that ordinarily lead to a high cost of $CO_2$ capture, thus making $CO_2$ capture and recovery in the present systems more efficient and more cost effective.

Upon exiting the second compressor, the compressed recycle stream may be split, and a first portion of the compressed recycle stream may be provided to the second combustion chamber for use as a diluent, as described previously. In such cases, the second portion of the compressed recycle stream not directed to the second combustion chamber may be fed to one or more separators, in which $CO_2$ and other greenhouse gases are separated from the compressed recycle stream. Although not described in detail herein, it will be recognized by those skilled in the art that intermediate heating, cooling, or other process operations may be required between the second compressor and the separator, so that the recycle stream enters the separator at conditions optimized for the particular separation process employed. In one or more embodiments, for example, a cooling unit may be used to cool the compressed recycle stream before it enters the separator.

The $CO_2$ separation process employed in the one or more separators may be any suitable process designed to separate the compressed recycle gases and result in a separator effluent stream comprising $CO_2$ and a separator product stream comprising nitrogen. In some embodiments, the product stream may also comprise oxygen, argon, or both. Separating the components of the compressed recycle stream allows different components in the exhaust to be handled in different ways. Ideally, the separation process would segregate all of the greenhouse gases in the exhaust, such as $CO_2$, CO, $NO_X$, $SO_X$, etc. in the effluent stream, leaving the remainder of the exhaust components such as nitrogen, oxygen, and argon in the product stream. In practice, however, the separation process may not withdraw all of the greenhouse gases from the product stream, and some non-greenhouse gases may remain in the effluent stream.

Any suitable separation process designed to achieve the desired result may be used. In one or more embodiments, the separation process is an oxygen-insensitive process. Examples of suitable separation processes include, but are not limited to, hot potassium carbonate ("hot pot") separation processes, amine separation, molecular sieve separation, membrane separation, adsorptive kinetic separation, controlled freeze zone separation, and combinations thereof. In some embodiments, the separator uses a hot pot separation process. In one or more embodiments of the invention, the separation process may be operated at elevated pressure (i.e., higher than ambient) and configured to keep the product stream pressurized. Maintaining pressure on the process in this manner allows for smaller separation equipment, provides for improved separation effectiveness, and allows for increased energy extraction from the product stream. In some embodiments, the $CO_2$ separation process is selected and configured to maximize either the outlet pressure or the outlet temperature, or both, of the product stream.

The separator effluent stream may be used for a variety of applications. For example, the effluent stream may be injected into a hydrocarbon reservoir for enhanced oil recovery (EOR) or may be directed to a reservoir for carbon sequestration or storage. The separator effluent stream may also be sold, vented, or flared.

In one or more embodiments, the separator product stream comprises nitrogen and also optionally comprises oxygen or argon (or both). The separator product stream may be split, and a first portion of the product stream may be provided to the first combustion chamber for use as a diluent, as described previously. In such cases, the second portion of the separator product stream not directed to the first combustion chamber may be directed to a third expander. In one or more embodiments, the third expander may be configured to receive the separator product stream and output the same gases at approximately ambient pressure. As will be appreciated by those skilled in the art, the third expander generates power, and the power generated may be used to drive one or more compressors or electric generators in any configuration, either within the described system or externally.

In one or more embodiments, the product stream may pass through one or more additional heat recovery steam generators (HRSGs) after expansion. The one or more HRSGs may be configured to utilize the residual heat in the stream to generate steam. The steam generated by the one or more HRSGs may be used for a variety of purposes, such as to drive a steam turbine generator in a Rankine cycle or for water desalination. Further, if any residual heat remains in the product stream exiting the one or more HRSGs, the system may further comprise one or more heat exchangers configured to transfer that heat to a non-steam working fluid. In such embodiments, the non-steam working fluid may optionally be used to drive an expander in a Rankine cycle.

The separator product stream may be used, wholly or in part, for a variety of applications. For example, the product stream may be injected into a hydrocarbon reservoir for pressure maintenance. The product stream may also be sold or vented. In one or more embodiments when pressure maintenance is not a viable option (or when only a portion of the product stream is required for pressure maintenance), the product stream may be cooled, by expansion or another method, and used to provide refrigeration in the systems described herein. For example, the cooled product stream may be used to provide refrigeration to reduce the suction temperature of one or more compressors within the system, or to chill water for use in one or more cooling units within the system.

In other embodiments when all or part of the product stream is not used for pressure maintenance, the product stream may instead be heated so that additional power may be generated for use elsewhere in the system or for sale. Some methods of heating the product stream include cross-exchanging the product stream with another process stream in a heat exchanger or using a supplementary combustor to supply additional heat to the product stream. It will be appreciated that the use of an additional combustor will require additional fuel. If a carbon-containing fuel is used in the combustor, additional $CO_2$ will be generated that will be unrecoverable from the product stream. Therefore, in some embodiments, the fuel used in the combustor may be a non-carbon fuel source, such as hydrogen. The oxidant required by the supplementary combustor may be supplied via a separate oxidant stream, or there may be sufficient oxidant in the product stream such that an additional supply of oxidant is unnecessary. Other possible methods for heating the separator product stream include using a heating coil in the HRSG to heat the product stream, using catalysis to combust any CO present in the product stream, or heating the stream as a consequence of using the product stream for cooling (i.e., as the product stream provides cooling to other streams or apparatus, the stream itself is heated).

Referring now to the figures, FIG. 1 illustrates a combined power generation system 100 configured to provide separation and capture of $CO_2$ after combustion. In at least one embodiment, the power generation system 100 can have a first compressor 118 coupled to a first expander 106 through a common shaft 108 or other mechanical, electrical, or other power coupling, thereby allowing a portion of the mechanical energy generated by the first expander 106 to drive the first compressor 118. The first expander 106 may generate power for other uses as well, such as to power another compressor, an electric generator, or the like. The first compressor 118 and first expander 106 may form the compressor and expander ends, respectively, of a standard gas turbine. In other embodiments, however, the first compressor 118 and first expander 106 can be individualized components in a system.

The system 100 can also include a first combustion chamber 110 configured to combust a first fuel stream 112 mixed with a first portion of compressed oxidant 114. In one or more embodiments, the first fuel stream 112 can include any suitable hydrocarbon gas or liquid, such as natural gas, methane, naphtha, butane, propane, syngas, diesel, kerosene, aviation fuel, coal derived fuel, bio-fuel, oxygenated hydrocarbon feedstock, or combinations thereof. The first fuel stream 112 may also comprise hydrogen. The first portion of compressed oxidant 114 supplied to the first combustion chamber 110 can be derived from the first compressor 118 fluidly coupled to the first combustion chamber 110 and adapted to compress a feed oxidant 120. While the discussion herein assumes that the feed oxidant 120 is ambient air, the oxidant may comprise any suitable gas containing oxygen, such as air, oxygen-rich air, substantially pure oxygen, or combinations thereof. In one or more embodiments, the first compressor 118, the first combustion chamber 110, and the first expander 106, taken together, can be characterized as a Brayton cycle. In one embodiment, the system is operated by mixing ambient air with a portion of recycle gas and compressing the mixture in a main air compressor (MAC). The high pressure mixture of air and recycle gas is mixed and combusted with fuel gas and additional high pressure recycle gas in a gas turbine combustor to produce high pressure products of combustion that are delivered to the gas turbine expander. A portion of the high pressure recycle gas may optionally be extracted from recycle gas compressor at various location and pressure levels and used to cool some parts of a gas turbine expander. The gas turbine expander exhaust is measured to determine the content of one or more components, e.g., oxygen, carbon dioxide, UBH, etc. by one or more sensors and the result of this measurement is used to adjust the position of a metering valve to control the mixture of ambient air and the portion of recycle gas at the inlet of the MAC. As a result, the oxygen content of the stream may be actively controlled to affect the desired stoichiometry of the combustion.

A first exhaust stream 116 is generated as a product of combustion of the first fuel stream 112 and the first portion of compressed oxidant 114 and directed to the inlet of the first expander 106. In at least one embodiment, the first fuel stream 112 can be primarily natural gas, thereby generating a first exhaust stream 116 including volumetric portions of vaporized water, $CO_2$, CO, oxygen, nitrogen, argon, nitrogen oxides ($NO_X$), and sulfur oxides ($SO_X$). In some embodiments, a small portion of unburned first fuel 112 or other compounds may also be present in the first exhaust 116 due to combustion equilibrium limitations. As the first exhaust stream 116 expands through the first expander 106, it generates mechanical power to drive the first compressor 118 or other facilities, and also produces a first gaseous exhaust stream 122.

The power generation system 100 may also have a second compressor 180 coupled to a second expander 170 through a common shaft 188 or other mechanical, electrical, or other power coupling, thereby allowing a portion of the mechanical energy generated by the second expander 170 to drive the second compressor 180. The second expander 170 may generate power for other uses as well, such as to power another compressor, an electric generator, or the like. The second compressor 180 and second expander 170 may form the compressor and expander ends, respectively, of a standard gas turbine. In other embodiments, however, the second compressor 180 and second expander 170 can be individualized components in a system.

The system 100 can also include a second combustion chamber 150 configured to combust a second fuel stream 152 mixed with a second portion of compressed oxidant 114. In one or more embodiments, the second fuel stream 152 can include any suitable hydrocarbon gas or liquid, such as natural gas, methane, naphtha, butane, propane, syngas, diesel, kerosene, aviation fuel, coal derived fuel, bio-fuel, oxygenated hydrocarbon feedstock, or combinations thereof. The second fuel stream 152 may also comprise hydrogen. The second portion of compressed oxidant 114 supplied to the second combustion chamber 150 can be derived from the first compressor 118 fluidly coupled to the second combustion chamber 150. In one or more embodiments, the second compressor 180, the second combustion chamber 150, and the second expander 170, taken together, can be characterized as a Brayton cycle.

A second exhaust stream 156 is generated as a product of combustion of the second fuel stream 152 and the second portion of compressed oxidant 114 and directed to the inlet of the second expander 170. In at least one embodiment, the second fuel stream 152 can be primarily natural gas, thereby generating a second exhaust stream 156 including volumetric portions of vaporized water, $CO_2$, CO, oxygen, nitrogen, argon, nitrogen oxides ($NO_X$), and sulfur oxides ($SO_X$). In some embodiments, a small portion of unburned second fuel 152 or other compounds may also be present in the second exhaust 156 due to combustion equilibrium limitations. As the second exhaust stream 156 expands through the second expander 170, it generates mechanical power to drive the second compressor 180 or other facilities, and also produces a second gaseous exhaust stream 172.

From the first expander 106 and the second expander 170, the first and second gaseous exhaust streams 122 and 172, respectively, are directed to a heat recovery steam generator (HRSG) 126 configured to use the residual heat in the gaseous exhaust streams 122 and 172 to generate steam 130 and combined exhaust stream 132. The steam 130 generated by the HRSG 126 may have a variety of uses, such as for example to generate additional power by driving a steam turbine generator in a Rankine cycle or for water desalination.

The combined exhaust 132 can be sent to at least one cooling unit 134 configured to reduce the temperature of the combined exhaust 132 and generate a cooled recycle stream 140. In one or more embodiments, the cooling unit 134 is considered herein to be a direct contact cooler (DCC), but may be any suitable cooling device such as a direct contact cooler, trim cooler, a mechanical refrigeration unit, or combinations thereof. The cooling unit 134 can also be configured to remove a portion of condensed water via a water dropout stream 136.

In one or more embodiments, the cooled recycle stream 140 can be directed to the second compressor 180 fluidly coupled to the cooling unit 134. The second compressor 180 can be configured to increase the pressure of the cooled recycle stream 140, thereby generating a compressed recycle stream 182. Upon exiting the second compressor 180, the compressed recycle stream 182 may be split, such that a portion of the compressed recycle stream 182 is directed to the second combustion chamber 150, where it may serve as a diluent to regulate combustion conditions within the second combustion chamber 150.

In one or more embodiments, the remaining portion of compressed recycle stream 182 not directed to the second combustion chamber is directed to a separator 162. The separator 162 may employ any of a variety of separation processes designed to separate the compressed recycle stream 182 into a separator effluent stream 166 comprising $CO_2$ and a separator product stream 164 generally comprising nitrogen and, in some cases, oxygen and/or argon. For example, the separator 162 may be designed to separate the compressed recycle stream 182 using a chemical separation process, such as hot potassium carbonate ("hot pot") separation, amine separation, or separation using a molecular sieve. Other separation processes include physical separation using membranes, or processes such as adsorptive kinetic separation or controlled freeze zone separation. In some embodiments, combinations of the foregoing separation methods may be used. In one or more embodiments, the $CO_2$ separation process may be configured to maximize the temperature or the pressure of the product stream 164. The separator effluent stream 166 may be used for a variety of downstream applications, such as injection into a hydrocarbon reservoir for enhanced oil recovery (EOR), carbon sequestration, storage, or sale. The effluent stream 166 may also be vented or flared.

In one or more embodiments, a portion of the product stream 164 exiting the separator 162 may be diverted and directed to the first combustion chamber 110 in recycle product stream 184. In this manner, recycle product stream 184 may serve as a diluent to regulate combustion conditions within the first combustion chamber 110. The remainder of product stream 164 may then be used to generate additional power. For example, product stream 164 may be directed to a third expander 190. The power generated by the third expander 190 may be used for a variety of purposes, such as to at least partially drive one or more additional compressors (not shown) or to drive an electric generator. In some embodiments, when the product stream is injected into a reservoir for pressure maintenance, the third expander 190 may be used to drive a pipeline or injection compressor.

In one or more embodiments, the expanded product stream 192 exiting the third expander 190 may be directed to a heat recovery steam generator (not shown) for additional power generation. The product stream 192, like the effluent stream 166, may also be used for a variety of other applications, including pressure maintenance, storage, or venting.

Figure 2:
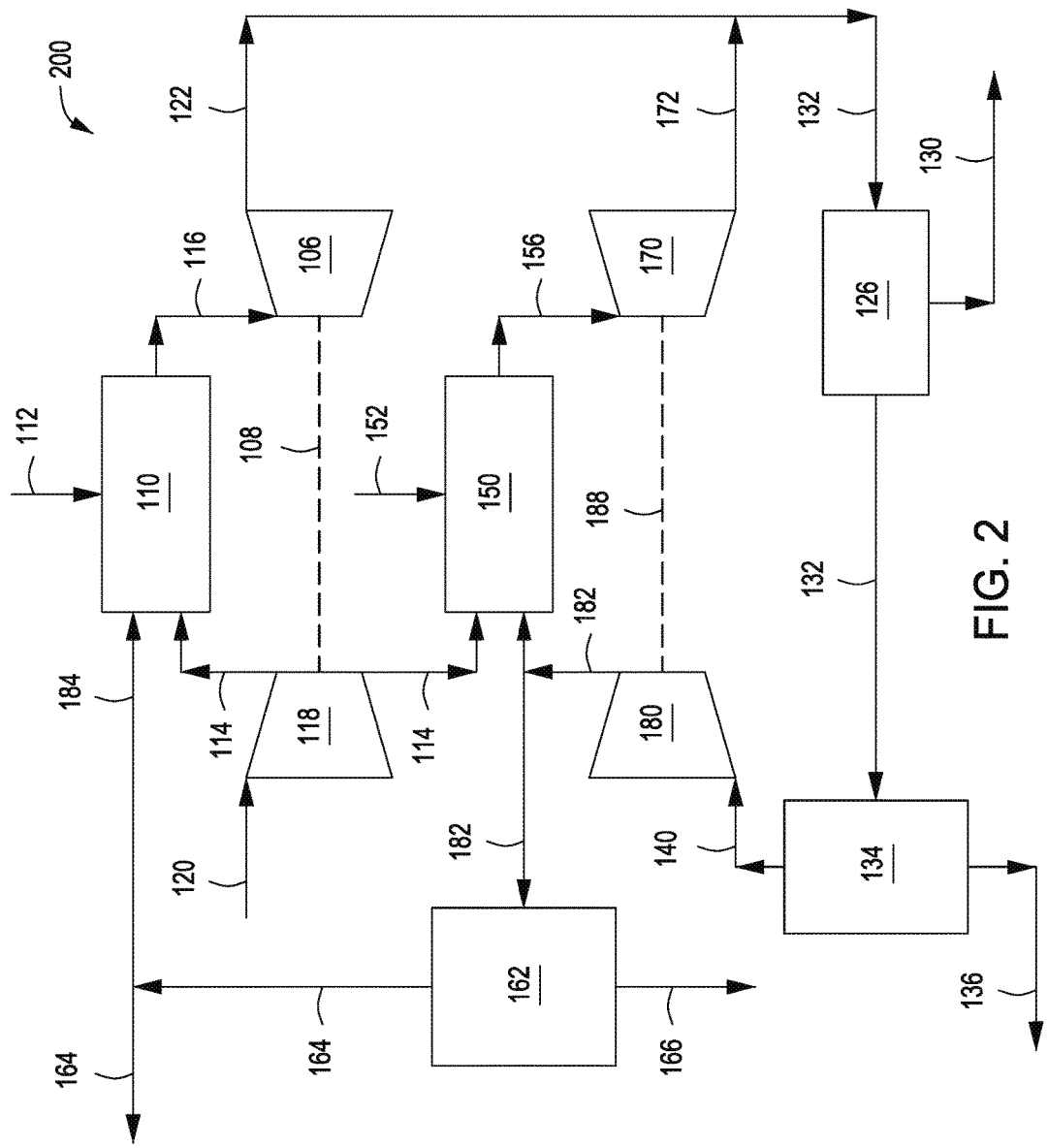
FIG. 2 depicts a variation of the combined low emission power generation system of FIG. 1 in which the exhaust streams from each turbine are combined prior to recovering heat from the streams.

Referring now to FIG. 2, depicted is an alternative configuration of the power generation system 100 of FIG. 1, embodied and described as system 200. As such, FIG. 2 may be best understood with reference to FIG. 1. In system 200 of FIG. 2, first gaseous exhaust stream 122 and second gaseous exhaust stream 172 are combined upstream of the HRSG 126 to form combined exhaust stream 132. The combined exhaust stream 132 is then directed to the HRSG 126 to cool the combined exhaust stream 132 and generate steam 130, and the remainder of the system operates as previously described with respect to FIG. 1.

Figure 3:
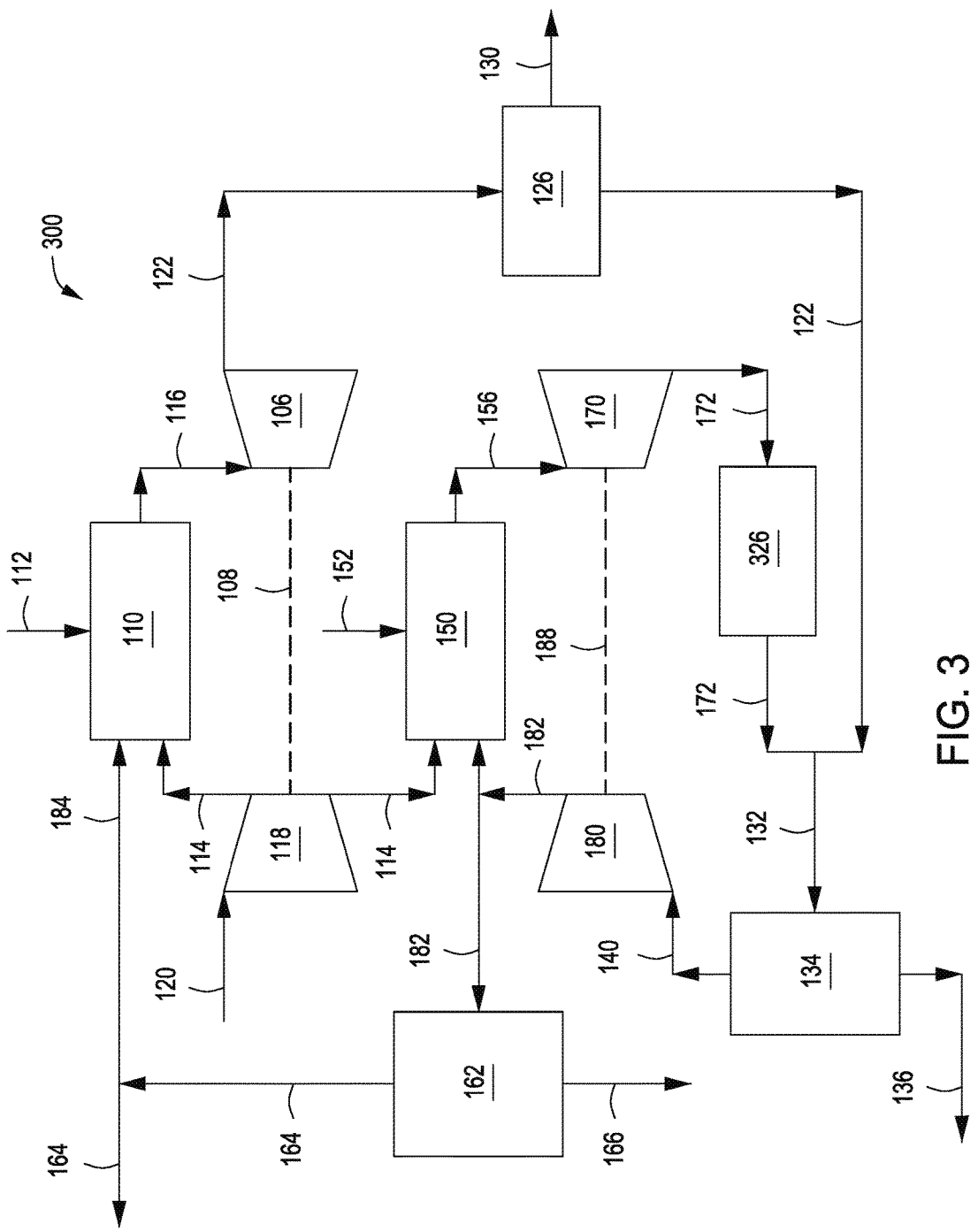
FIG. 3 depicts a variation of the combined low emission power generation system of FIG. 1 in which the heat is recovered from the exhaust streams from each turbine separately and the streams are combined after heat recovery.

Referring now to FIG. 3, depicted is an alternative configuration of the power generation system 100 of FIG. 1, embodied and described as system 300. In system 300 of FIG. 3, each of the gaseous exhaust streams is cooled separately before being combined. Specifically, the first gaseous exhaust stream 122 is cooled in the HRSG 126, while the second gaseous exhaust stream 172 is cooled in an additional HRSG 326. First and second gaseous exhaust streams 122 and 172 exit HRSGs 126 and 326, respectively, and are then combined downstream of the HRSGs to form combined exhaust stream 132. The remainder of the system operates as previously described with respect to FIG. 1.

While the present disclosure may be susceptible to various modifications and alternative forms, the exemplary embodiments discussed above have been shown only by way of example. Any features or configurations of any embodiment described herein may be combined with any other embodiment or with multiple other embodiments (to the extent feasible) and all such combinations are intended to be within the scope of the present invention. Additionally, it should be understood that the disclosure is not intended to be limited to the particular embodiments disclosed herein. Indeed, the present disclosure includes all alternatives, modifications, and equivalents falling within the true spirit and scope of the appended claims.

What is claimed is:

1. A method for generating power comprising:
compressing one or more oxidants in a first compressor to generate a compressed oxidant;
supplying a first portion of the compressed oxidant, at least one first fuel, and a first diluent to a first combustion chamber;
substantially stoichiometrically combusting the first portion of the compressed oxidant and the at least one first fuel in the first combustion chamber to generate a first exhaust stream;
expanding the first exhaust stream in a first expander to generate a first gaseous exhaust stream;
using one or more sensors to measure one or more components of the first gaseous exhaust stream;
controlling a flow of the first portion of the compressed oxidant into the first combustion chamber by adjusting a metering valve based on one or more measurements from the one or more sensors in order to maintain substantially stoichiometric combustion conditions in the first combustion chamber, wherein substantially stoichiometric combustion is a combustion reaction having an equivalence ratio in a range of 0.9:1 to 1.1:1;
compressing a cooled recycle stream in a second compressor to generate a compressed recycle stream;
supplying a second portion of the compressed oxidant, at least one second fuel, and a second diluent to a second combustion chamber;
combusting the second portion of the compressed oxidant and the at least one second fuel in the second combustion chamber to generate a second exhaust stream;
expanding the second exhaust stream in a second expander to generate a second gaseous exhaust stream;
recovering heat from the first and second gaseous exhaust streams;
combining the first and second gaseous exhaust streams to form a combined exhaust stream;
cooling the combined exhaust stream to generate the cooled recycle stream;
splitting the compressed recycle stream into a first portion and a second portion of the compressed recycle stream; and
separating the first portion of the compressed recycle stream to generate an effluent stream primarily comprising carbon dioxide and a product stream primarily comprising at least one of nitrogen, oxygen, and argon;

wherein the first diluent comprises a first portion of the product stream and the second diluent comprises at least a portion of the second portion of the compressed recycle stream.

2. The method of claim 1, wherein heat is recovered from the first gaseous exhaust stream, the second gaseous exhaust stream, or both in one or more heat recovery steam generators.

3. The method of claim 1, wherein the first and second gaseous exhaust streams are combined before recovering heat from the first and second gaseous exhaust streams.

4. The method of claim 1, wherein the first and second gaseous exhaust streams are combined after recovering heat from the first and second gaseous exhaust streams.

5. The method of claim 1, wherein the combined exhaust stream is cooled in a direct contact cooler.

6. The method of claim 1, wherein the first portion of the compressed recycle stream is separated using a process selected from a hot potassium carbonate separation process, an amine separation process, a molecular sieve separation process, a membrane separation process, an adsorptive kinetic separation process, a controlled freeze zone separation process, or combinations thereof.

7. The method of claim 6, wherein the first portion of the compressed recycle stream is separated using the hot potassium carbonate separation process.

8. The method of claim 1, further comprising compressing at least a portion of the effluent stream to generate a compressed effluent stream and injecting the compressed effluent stream into a hydrocarbon reservoir for enhanced oil recovery.

9. The method of claim 1, further comprising injecting a second portion of the product stream into a hydrocarbon reservoir for pressure maintenance.

10. The method of claim 1, further comprising expanding a second portion of the product stream to generate power.

11. The method of claim 10, further comprising heating the second portion of the product stream prior to expansion.

12. The method of claim 1, further comprising cooling the first portion of the compressed recycle stream prior to separation.

13. A power generation system comprising:
a first compressor configured to receive and compress one or more oxidants to generate a compressed oxidant;
a first combustion chamber configured to receive and substantially stoichiometrically combust a first portion of the compressed oxidant, at least one first fuel, and a first diluent to generate a first exhaust stream;
a first expander configured to receive the first exhaust stream from the first combustion chamber and generate a first gaseous exhaust stream;
one or more sensors used to measure one or more components of the first gaseous exhaust stream;
a metering valve configured to be adjusted to control a flow of the first portion of the compressed oxidant into the first combustion chamber based on one or more measurements from the one or more sensors in order to maintain substantially stoichiometric combustion conditions in the first combustion chamber, wherein substantially stoichiometric combustion is a combustion reaction having an equivalence ratio in a range of 0.9:1 to 1.1:1;
a second compressor configured to receive and compress a cooled recycle stream to generate a compressed recycle stream;
a second combustion chamber configured to receive and combust a second portion of the compressed oxidant, at least one second fuel, and a second diluent to generate a second exhaust stream;
a second expander configured to receive the second exhaust stream from the second combustion chamber and generate a second gaseous exhaust stream;
a heat recovery steam generator configured to receive and cool the first and second gaseous exhaust streams to generate a combined exhaust stream and steam;
a cooling unit configured to receive and cool the combined exhaust stream and generate the cooled recycle stream; and
a separator configured to receive and separate a first portion of the compressed recycle stream into a separator effluent stream primarily comprising carbon dioxide and a separator product stream primarily comprising at least one of nitrogen, oxygen, and argon;
wherein the compressed recycle stream is split into the first portion and a second portion upstream of the separator, the first diluent comprises a first portion of the separator product stream, and the second diluent comprises at least a portion of the second portion of the compressed recycle stream.

14. The power generation system of claim 13, wherein the cooling unit is a direct contact cooler.

15. The power generation system of claim 13, wherein the separator uses a separation process selected from a hot potassium carbonate separation process, an amine separation process, a molecular sieve separation process, a membrane separation process, an adsorptive kinetic separation process, a controlled freeze zone separation process, or combinations thereof.

16. The power generation system of claim 15, wherein the separator uses the hot potassium carbonate separation process.

17. The power generation system of claim 13, wherein the separator effluent stream is used for enhanced oil recovery in a hydrocarbon reservoir.

18. The power generation system of claim 13, wherein the separator product stream is used for pressure maintenance in a hydrocarbon reservoir.

19. The power generation system of claim 13, further comprising a third expander configured to a second at least a portion of the separator product stream.

20. The power generation system of claim 19, further comprising a product heating unit configured to receive and heat the second portion of the separator product stream directed to the third expander.

21. The power generation system of claim 13, further comprising a separator cooling unit configured to receive and cool first the portion of the compressed recycle stream directed to the separator.

* * * * *